United States Patent
Zhao et al.

(10) Patent No.: US 11,106,517 B2
(45) Date of Patent: Aug. 31, 2021

(54) MULTI-PATH FAULT DETECTION

(71) Applicant: Huawei Technologies Co., Ltd., Shenzhen (CN)

(72) Inventors: Hongbo Zhao, Nanjing (CN); Yuping Zhao, Nanjing (CN); Xinyu Hu, Nanjing (CN); Qian Cao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 16/734,912

(22) Filed: Jan. 6, 2020

(65) Prior Publication Data

US 2020/0151075 A1    May 14, 2020

Related U.S. Application Data

(63) Continuation of application No. PCT/CN2018/084994, filed on Apr. 28, 2018.

(30) Foreign Application Priority Data

Jul. 6, 2017 (CN) .......................... 201710547278.4

(51) Int. Cl.
*G06F 11/07* (2006.01)

(52) U.S. Cl.
CPC ...... *G06F 11/0712* (2013.01); *G06F 11/0751* (2013.01)

(58) Field of Classification Search
CPC .................... G06F 11/0712; G06F 11/0751
See application file for complete search history.

(56) References Cited

U.S. PATENT DOCUMENTS 7,760,656 B1    7/2010  Yuan et al.
9,001,827 B2 *  4/2015  Appenzeller ......... H04L 49/254
                                                  370/392
(Continued)

FOREIGN PATENT DOCUMENTS

CN    101783745 A    7/2010
CN    102143014 A    8/2011
(Continued)

OTHER PUBLICATIONS

Machine Translation and Abstract of Chinese Publication No. CN101783745, Jul. 21, 2010, 21 pages.
(Continued)

*Primary Examiner* — Joseph R Kudirka
(74) *Attorney, Agent, or Firm* — Conley Rose, P.C.

(57) ABSTRACT

A method for implementing fault detection includes: instructing, by a detection device, a detected device to configure a detected path and a return path, where the detected path is a path from a first physical port of the detected device to a second physical port of the detected device via a target unit of the detected device, the return path is a path from the second physical port to the detection device, and the target unit is a VNF or an accelerator; sending a detection packet to the detected device through the first physical port; and when receiving the detection packet transmitted through the detected path and the return path, determining that the detected path is not faulty. According to the method, it can be further determined that the path that passes through the VNF or the accelerator is not faulty.

20 Claims, 8 Drawing Sheets

(56) References Cited

U.S. PATENT DOCUMENTS

| | | | |
|---|---|---|---|
| 10,257,033 B2* | 4/2019 | Shimamura | H04L 41/5045 |
| 2017/0104608 A1* | 4/2017 | Sergeev | H04L 12/4641 |
| 2017/0116018 A1 | 4/2017 | Miller | |
| 2019/0288905 A1 | 9/2019 | Wang et al. | |

FOREIGN PATENT DOCUMENTS

| | | |
|---|---|---|
| CN | 104253711 A | 12/2014 |
| CN | 104683240 A | 6/2015 |
| CN | 106452925 A | 2/2017 |

OTHER PUBLICATIONS

Machine Translation and Abstract of Chinese Publication No. CN102143014, Aug. 3, 2011, 13 pages.

Machine Translation and Abstract of Chinese Publication No. CN104253711, Dec. 31, 2014, 17 pages.

Bernstein, A., "Availability for Network Function Virtualization," Cisco, Spring Technical Forum Proceedings, 2015, 6 pages.

"Network Functions Virtualisation (NFV); Acceleration Technologies; Report on Acceleration Technologies and Use Cases," ETSI GS NFV-IFA 001, V1.1.1, Dec. 2015, 38 pages.

"Network Functions Virtualisation (NFV); Resiliency Requirements," ETSI GS NFV-IFA 001, V1.1.1, Jan. 2015, 82 pages.

* cited by examiner

MULTI-PATH FAULT DETECTION

CROSS-REFERENCE TO RELATED APPLICATIONS

This is a continuation of Int'l Patent App. No. PCT/CN2018/084998 filed on Apr. 28, 2018, which claims priority to Chinese Patent App. No. 201710547278.4 filed on Jul. 6, 2017, which are incorporated by reference.

TECHNICAL FIELD

Embodiments of the present disclosure relate to the field of communications technologies, and in particular, to a method and a system for implementing fault detection, and an apparatus.

BACKGROUND

Fault detection on network devices is significant for fast network service recovery and minimizing service impact caused by network interruption.

In some approaches, when a detection device performs fault detection on a network device, a detection packet sent by the detection device enters the network device from a physical port of the network device, and after being processed by the network device, the detection packet is returned from another physical port of the network device to the detection device. If receiving the detection packet returned by the network device, the detection device determines that the network device is not faulty.

Because a plurality of paths may exist in the network device, if one of the paths is faulty and another path is not faulty, the detection device can still receive the detection packet returned by the network device, and determine that the network device is not faulty. However, the detection result is inaccurate.

SUMMARY

Embodiments of the present disclosure provide a method and a system for implementing fault detection, and an apparatus, to improve fault detection accuracy.

According to a first aspect, a method for implementing fault detection is provided. The method includes: instructing, by a detection device, a detected device to configure a detected path and a return path, where the detected path is a path from a first physical port of the detected device to a second physical port of the detected device via a target unit, the return path is a path from the second physical port to the detection device, and the target unit is a virtualized network function (VNF) of the detected device or an accelerator of the detected device; sending a detection packet to the detected device through the first physical port of the detected device; and when receiving the detection packet transmitted through the detected path and the return path, determining that the detected path is not faulty. According to this implementation, it can be further determined that the path that passes through the VNF or the accelerator and that is in the detected device is not faulty, thereby improving fault detection accuracy.

In a first implementation of the first aspect, the instructing, by a detection device, a detected device to configure a detected path and a return path may include: instructing, by the detection device, the detected device to configure a detection entry into a target forwarding table. The target forwarding table is a forwarding table of the target unit. The detection entry is used to instruct to: when a packet matching the detection entry is received, change a destination address of the packet to an address of the detection device, and send the packet through the second physical port. Correspondingly, the detection packet includes information that matches the detection entry, and a destination address of the detection packet is an address corresponding to the first physical port of the detected device. During specific implementation, the detection device may be a standby device of the detected device.

According to this implementation, when the detected path is not faulty, it can be ensured that the detection packet is accurately returned to the detection device along the detected path and the return path, thereby further improving fault detection accuracy.

According to the first aspect or the first implementation of the first aspect, in a second implementation, the detection entry meets: Condition 1: The detection packet matching the detection entry does not match any existing entry; or Condition 2: A priority of the detection entry is higher than a priority of any existing entry that can match the detection packet.

The existing entry is an entry included in the forwarding table of the VNF or the forwarding table of the accelerator before the detection entry is configured.

During specific implementation, the detection device may set a value of a detection match field in the detection entry to enable the detection entry and the detection packet to meet Condition 1 or Condition 2. The detection match field is some or all match fields in the target forwarding table.

Because the detection entry meets Condition 1 or Condition 2, impact of the existing entry on the detection packet can be avoided, thereby further improving fault detection accuracy.

When the target forwarding table includes an exact match field (it is assumed that the target forwarding table includes N exact match fields, where $N \geq 1$), the detection match field may include M match fields in the N exact match fields, where $M \leq N$.

Correspondingly, when M is equal to 1, a value that is set by the detection device and that corresponds to the M match fields in the detection entry is different from a value corresponding to the M match fields in any existing entry, or when M is greater than or equal to 2, a combination of values that are set and that correspond to the M match fields in the detection entry is different from a combination of values corresponding to the M match fields in any existing entry.

The existing entry usually includes an entry that matches a service packet. The value or the combination of values corresponding to the M exact match fields in the detection entry is different from the value or the combination of values corresponding to the M match fields in any existing entry. Certainly, a service packet that can match the existing entry does not match the detection entry. In this way, not only impact of the existing entry on the detection packet can be avoided, but also impact of the detection entry on the service packet can be avoided.

According to the first aspect, the first implementation of the first aspect, or the second implementation of the first aspect, in a third implementation, the detection match field includes a source Internet Protocol (IP) address, and a value corresponding to the source IP address in the detection entry is an IP address that is of the detection device and that is not used for communicating with another device.

The IP address that is of the detection device and that is not used for communicating with the another device usually does not exist in a forwarding table of the detected device (that is, the forwarding table of the VNF or the forwarding table of the accelerator). Therefore, impact of the existing entry on the detection packet can be avoided, and fault detection accuracy is further improved.

According to the first aspect, the first implementation of the first aspect, or the second implementation of the first aspect, in a fourth implementation, the detection packet is sent between the detection device and the detected device through a layer-2 network; and the detection entry is used to instruct to: when a packet matching the detection entry is received, change a destination media access control MAC address of the packet to a media access control (MAC) address of the detection device, and send the packet through the second physical port of the detected device; and the detection match field includes a source IP address, and a value corresponding to the source IP address in the detection entry is an IP address that is of the detection device and that is not used for communicating with another device; or the detection match field includes a destination IP address, and a value corresponding to the destination IP address in the detection entry is an IP address that is of the detection device and that is not used for communicating with another device.

The IP address that is of the detection device and that is not used for communicating with the another device usually may not exist in a forwarding table of the detected device. Therefore, impact of the existing entry on the detection packet can be avoided, and fault detection accuracy is further improved. In addition, because the detection packet is sent between the detection device and the detected device through the layer-2 network, using an IP address of the detection device as a destination IP address does not affect normal sending of the detection packet to the first physical port.

According to the first aspect, the first implementation of the first aspect, or the second implementation of the first aspect, in a fifth implementation, the detection packet is sent between the detection device and the detected device through a layer-2 network; and the detection entry is used to instruct to: when a packet matching the detection entry is received, change a destination MAC address of the packet to a MAC address of the detection device, and send the packet through the second physical port of the detected device; and the detection match field includes a source IP address, and a value corresponding to the source IP address in the detection entry is an IP address of a cold backup device (for example, a cold backup device of the detected device); or the detection match field includes a destination IP address, and a value corresponding to the destination IP address in the detection entry is an IP address of a cold backup device.

During specific implementation, the detection device may be the cold backup device.

The IP address of the cold backup device usually does not participate in network communication, and the forwarding table of the detected device usually does not have an entry that includes the IP address of the cold backup device. Therefore, impact of the existing entry on the detection packet can be avoided, and fault detection accuracy is improved.

According to a second aspect, a method for implementing fault detection is provided. The method includes: configuring, by a detected device, a detected path and a return path, where the detected path is a path from a first physical port of the detected device to a second physical port of the detected device via a target unit, the return path is a path from the second physical port to a detection device, and the target unit is a VNF of the detected device or an accelerator of the detected device; and after receiving a detection packet through the first physical port, transmitting the detection packet through the detected path and the return path.

According to an implementation of the second aspect, it can be further determined that the path that passes through the VNF or the accelerator and that is in the detected device is not faulty, thereby improving fault detection accuracy.

In a first implementation of the second aspect, the configuring, by a detected device, a detected path and a return path may include: configuring, by the detected device, a detection entry into a target forwarding table. The target forwarding table is a forwarding table of the target unit. The detection entry is used to instruct to: when a packet matching the detection entry is received, change a destination address of the packet to an address of the detection device, and send the packet through the second physical port. Correspondingly, the transmitting, by the detected device, the detection packet through the detected path and the return path may include: when determining that the received detection packet matches the detection entry in the target forwarding table, changing, by the detected device, a destination address of the detection packet to the address of the detection device, and sending the detection packet through the second physical port of the detected device.

According to this implementation, when the detected path is not faulty, it can be ensured that the detection packet is accurately returned to the detection device along the detected path and the return path, thereby further improving fault detection accuracy.

According to the second aspect or the first implementation of the second aspect, in a second implementation, the detection entry meets: Condition 1: The detection packet matching the detection entry does not match any existing entry; or Condition 2: A priority of the detection entry is higher than a priority of any existing entry that can match the detection packet.

The existing entry is an entry included in the forwarding table of the VNF or the forwarding table of the accelerator before the detection entry is configured.

During specific implementation, the detected device may set a value of a detection match field in the detection entry to enable the detection entry and the detection packet to meet Condition 1 or Condition 2. The detection match field is some or all match fields in the target forwarding table.

Because the detection entry meets Condition 1 or Condition 2, impact of the existing entry on the detection packet can be avoided, thereby further improving fault detection accuracy.

When the target forwarding table includes an exact match field (it is assumed that the target forwarding table includes N exact match fields, where N≥1), the detection match field may include M match fields in the N exact match fields, where M≤N.

Correspondingly, when M is equal to 1, a value that is set by the detection device and that corresponds to the M match fields in the detection entry is different from a value corresponding to the M match fields in any existing entry, or when M is greater than or equal to 2, a combination of values that are set and that correspond to the M match fields in the detection entry is different from a combination of values corresponding to the M match fields in any existing entry.

The existing entry usually includes an entry that matches a service packet. The value or the combination of values corresponding to the M exact match fields in the detection entry is different from the value or the combination of values corresponding to the M match fields in any existing entry. Certainly, a service packet that can match the existing entry does not match the detection entry. In this way, not only impact of the existing entry on the detection packet can be avoided, but also impact of the detection entry on the service packet can be avoided.

According to the second aspect, the first implementation of the second aspect, or the second implementation of the second aspect, in a third implementation, the detection packet is sent between the detection device and the detected device through a layer-2 network; and the detection entry is used to instruct to: when a packet matching the detection entry is received, change a destination media access control MAC address of the packet to a MAC address of the detection device, and send the packet through the second physical port of the detected device; and the detection match field includes a source internet protocol IP address, and a value corresponding to the source IP address in the detection entry is an IP address that is of the detection device and that is not used for communicating with another device; or the detection match field includes a destination IP address, and a value corresponding to the destination IP address in the detection entry is an IP address that is of the detection device and that is not used for communicating with another device.

The IP address that is of the detection device and that is not used for communicating with the another device usually does not exist in a forwarding table of the detected device (that is, the forwarding table of the VNF or the forwarding table of the accelerator). Therefore, impact of the existing entry on the detection packet can be avoided, and fault detection accuracy is further improved.

According to the second aspect, the first implementation of the second aspect, or the second implementation of the second aspect, in a fourth implementation, the detection packet is sent between the detection device and the detected device through a layer-2 network; and the detection entry is used to instruct to: when a packet matching the detection entry is received, change a destination MAC address of the packet to a MAC address of the detection device, and send the packet through the second physical port of the detected device; and the detection match field includes a source IP address, and a value corresponding to the source IP address in the detection entry is an IP address of a cold backup device (for example, a cold backup device of the detected device); or the detection match field includes a destination IP address, and a value corresponding to the destination IP address in the detection entry is an IP address of a cold backup device.

During specific implementation, the detection device may be the cold backup device.

The IP address of the cold backup device usually does not participate in network communication, and the forwarding table of the detected device usually does not have an entry that includes the IP address of the cold backup device. Therefore, impact of the existing entry on the detection packet can be avoided, and fault detection accuracy is improved.

According to a third aspect, a detection device is provided, and the detection device includes a detection module and a communications module.

The communications module is configured to communicate with a detected device.

The detection module is configured to: instruct, by using the communications module, the detected device to configure a detected path and a return path, where the detected path is a path from a first physical port of the detected device to a second physical port of the detected device via a target unit, the return path is a path from the second physical port to the detection device, and the target unit is a VNF of the detected device or an accelerator of the detected device; and is further configured to: send a detection packet to the detected device by using the communications module and through the first physical port of the detected device, and when receiving, by using the communications module, the detection packet transmitted through the detected path and the return path, determine that the detected path is not faulty.

According to an implementation of the third aspect, it can be further determined that the path that passes through the VNF or the accelerator and that is in the detected device is not faulty, thereby improving fault detection accuracy.

In a first implementation of the third aspect, when instructing, by using the communications module, the detected device to configure the detected path and the return path, the detection module is further configured to: instruct, by using the communications module, the detected device to configure a detection entry into a target forwarding table. The target forwarding table is a forwarding table of the target unit. The detection entry is used to instruct to: when a packet matching the detection entry is received, change a destination address of the packet to an address of the detection device, and send the packet through the second physical port. Correspondingly, the detection packet includes information that matches the detection entry, and a destination address of the detection packet is an address corresponding to the first physical port of the detected device.

According to this implementation, when the detected path is not faulty, it can be ensured that the detection packet is accurately returned to the detection device along the detected path and the return path, thereby further improving fault detection accuracy.

According to the third aspect or the first implementation of the third aspect, in a second implementation, the detection entry meets: Condition 1: The detection packet matching the detection entry does not match any existing entry; or Condition 2: A priority of the detection entry is higher than a priority of any existing entry that can match the detection packet.

The existing entry is an entry included in the forwarding table of the VNF or the forwarding table of the accelerator before the detection entry is configured.

During specific implementation, the detection module may set a value of a detection match field in the detection entry to enable the detection entry and the detection packet to meet Condition 1 or Condition 2. The detection match field is some or all match fields in the target forwarding table.

Because the detection entry meets Condition 1 or Condition 2, impact of the existing entry on the detection packet can be avoided, thereby further improving fault detection accuracy.

When the target forwarding table includes an exact match field (it is assumed that the target forwarding table includes N exact match fields, where N≥1), the detection match field may include M match fields in the N exact match fields, where M≤N.

Correspondingly, when M is equal to 1, a value that is set by the detection module and that corresponds to the M match fields in the detection entry is different from a value corresponding to the M match fields in any existing entry, or when M is greater than or equal to 2, a combination of values that are set and that correspond to the M match fields in the detection entry is different from a combination of values corresponding to the M match fields in any existing entry.

The existing entry usually includes an entry that matches a service packet. The value or the combination of values corresponding to the M exact match fields in the detection entry is different from the value or the combination of values corresponding to the M match fields in any existing entry. Certainly, a service packet that can match the existing entry does not match the detection entry. In this way, not only impact of the existing entry on the detection packet can be avoided, but also impact of the detection entry on the service packet can be avoided.

According to the third aspect, the first implementation of the third aspect, or the second implementation of the third aspect, in a third implementation, the detection packet is sent between the detection device and the detected device through a layer-2 network; and the detection entry is used to instruct to: when a packet matching the detection entry is received, change a destination media access control MAC address of the packet to a MAC address of the detection device, and send the packet through the second physical port of the detected device; and the detection match field includes a source IP address, and a value corresponding to the source IP address in the detection entry is an IP address that is of the detection device and that is not used for communicating with another device; or the detection match field includes a destination IP address, and a value corresponding to the destination IP address in the detection entry is an IP address that is of the detection device and that is not used for communicating with another device.

The IP address that is of the detection device and that is not used for communicating with the another device usually does not exist in a forwarding table of the detected device, and in particular, may not be used as a value corresponding to a destination address in the forwarding table of the detected device. Therefore, impact of the existing entry on the detection packet can be avoided, and fault detection accuracy is further improved.

According to the third aspect, the first implementation of the third aspect, or the second implementation of the third aspect, in a fourth implementation, the detection packet is sent between the detection device and the detected device through a layer-2 network; and the detection entry is used to instruct to: when a packet matching the detection entry is received, change a destination media access control MAC address of the packet to a MAC address of the detection device, and send the packet through the second physical port of the detected device; and the detection match field includes a source IP address, and a value corresponding to the source IP address in the detection entry is an IP address of a cold backup device (for example, a cold backup device of the detected device); or the detection match field includes a destination IP address, and a value corresponding to the destination IP address in the detection entry is an IP address of a cold backup device.

During specific implementation, the detection device may be the cold backup device.

The IP address of the cold backup device usually does not participate in network communication, and the forwarding table of the detected device usually does not have an entry that includes the IP address of the cold backup device. Therefore, impact of the existing entry on the detection packet can be avoided, and fault detection accuracy is improved.

According to a fourth aspect, a network device for implementing fault detection is provided, including a VNF and an accelerator.

The VNF is configured to configure a detected path and a return path. The detected path is a path from a first physical port of the network device to a second physical port of the network device via a target unit. The return path is a path from the second physical port to the detection device. The target unit is the VNF of the network device or the accelerator of the network device.

When the target unit is the VNF, the VNF is further configured to: when receiving a detection packet that is received through the first physical port and that is reported by the accelerator, transmit the received detection packet through the detected path and the return path.

Alternatively, when the target unit is the accelerator, the accelerator is configured to: when receiving the detection packet through the first physical port, transmit the detection packet through the detected path and the return path.

According to an implementation of the fourth aspect, it can be further determined that the path that passes through the VNF or the accelerator and that is in the detected device is not faulty, thereby improving fault detection accuracy.

In a first implementation of the fourth aspect, when configuring the detected path and the return path the VNF may be further configured to configure a detection entry into a target forwarding table. The target forwarding table is a forwarding table of the target unit. The detection entry is used to instruct to: when a packet matching the detection entry is received, change a destination address of the packet to an address of the detection device, and send the packet through the second physical port of the network device. Correspondingly, when transmitting the received detection packet through the detected path and the return path, the VNF or the accelerator may be further configured to: when determining that the received detection packet matches the detection entry in the target forwarding table, change a destination address of the detection packet to the address of the detection device, and send the detection packet through the second physical port of the network device.

According to this implementation, when the detected path is not faulty, it can be ensured that the detection packet is accurately returned to the detection device along the detected path and the return path, thereby further improving fault detection accuracy.

According to the fourth aspect or the first implementation of the fourth aspect, in a second implementation, the detection entry meets: Condition 1: The detection packet matching the detection entry does not match any existing entry; or Condition 2: A priority of the detection entry is higher than a priority of any existing entry that can match the detection packet.

The existing entry is an entry included in the forwarding table of the VNF or the forwarding table of the accelerator before the detection entry is configured.

During specific implementation, the VNF may set a value of a detection match field in the detection entry to enable the detection entry and the detection packet to meet Condition 1 or Condition 2. The detection match field is some or all match fields in the target forwarding table.

Because the detection entry meets Condition 1 or Condition 2, impact of the existing entry on the detection packet can be avoided, thereby further improving fault detection accuracy.

When the target forwarding table includes an exact match field (it is assumed that the target forwarding table includes N exact match fields, where N≥1), the detection match field may include M match fields in the N exact match fields, where M≤N.

Correspondingly, when M is equal to 1, a value that is set by the detection device and that corresponds to the M match fields in the detection entry is different from a value corresponding to the M match fields in any existing entry, or when M is greater than or equal to 2, a combination of values that are set and that correspond to the M match fields in the detection entry is different from a combination of values corresponding to the M match fields in any existing entry.

The existing entry usually includes an entry that matches a service packet. The value or the combination of values corresponding to the M exact match fields in the detection entry is different from the value or the combination of values corresponding to the M match fields in any existing entry. Certainly, a service packet that can match the existing entry does not match the detection entry. In this way, not only impact of the existing entry on the detection packet can be avoided, but also impact of the detection entry on the service packet can be avoided.

According to the fourth aspect, the first implementation of the fourth aspect, or the second implementation of the fourth aspect, in a third implementation, the detection packet is sent between the detection device and the detected device through a layer-2 network; and the detection entry is used to instruct to: when a packet matching the detection entry is received, change a destination media access control MAC address of the packet to a MAC address of the detection device, and send the packet through the second physical port of the detected device; and the detection match field includes a source IP address, and a value corresponding to the source IP address in the detection entry is an IP address that is of the detection device and that is not used for communicating with another device; or the detection match field includes a destination IP address, and a value corresponding to the destination IP address in the detection entry is an IP address that is of the detection device and that is not used for communicating with another device.

The IP address that is of the detection device and that is not used for communicating with the another device usually may not exist in a forwarding table of the detected device (that is, the forwarding table of the VNF or the forwarding table of the accelerator). Therefore, impact of the existing entry on the detection packet can be avoided, and fault detection accuracy is further improved.

According to the fourth aspect, the first implementation of the fourth aspect, or the second implementation of the fourth aspect, in a fourth implementation, the detection packet is sent between the detection device and the detected device through a layer-2 network; and the detection entry is used to instruct to: when a packet matching the detection entry is received, change a destination MAC address of the packet to a MAC address of the detection device, and send the packet through the second physical port of the detected device; and the detection match field includes a source IP address, and a value corresponding to the source IP address in the detection entry is an IP address of a cold backup device (for example, a cold backup device of the detected device); or the detection match field includes a destination IP address, and a value corresponding to the destination IP address in the detection entry is an IP address of a cold backup device.

During specific implementation, the detection device may be the cold backup device.

The IP address of the cold backup device usually does not participate in network communication, and the forwarding table of the detected device usually does not have an entry that includes the IP address of the cold backup device. Therefore, impact of the existing entry on the detection packet can be avoided, and fault detection accuracy is improved.

According to a fifth aspect, a detection device is provided, and the detection device includes a processor and a memory.

The memory is configured to store a computer operation instruction.

The processor is configured to execute the computer operation instruction stored in the memory, so that the detection device performs the method provided in the first aspect.

According to a sixth aspect, a network device is provided, and the network device includes a processor and a memory.

The memory is configured to store a computer operation instruction.

The processor is configured to execute the computer operation instruction stored in the memory, so that the network device performs the method provided in the second aspect.

According to a seventh aspect, a computer-readable storage medium is provided, and the computer-readable storage medium stores an instruction. When the instruction is run on a computer, the computer is enabled to perform the methods in the foregoing aspects.

According to an eighth aspect, a computer program product including an instruction is provided. When the computer program product is run on a computer, the computer is enabled to perform the methods in the foregoing aspects.

BRIEF DESCRIPTION OF DRAWINGS

To describe the technical solutions in the embodiments of the present disclosure more clearly, the following briefly describes the accompanying drawings.

DESCRIPTION OF EMBODIMENTS

The following describes the embodiments of the present disclosure with reference to the accompanying drawings.

Figure 1:
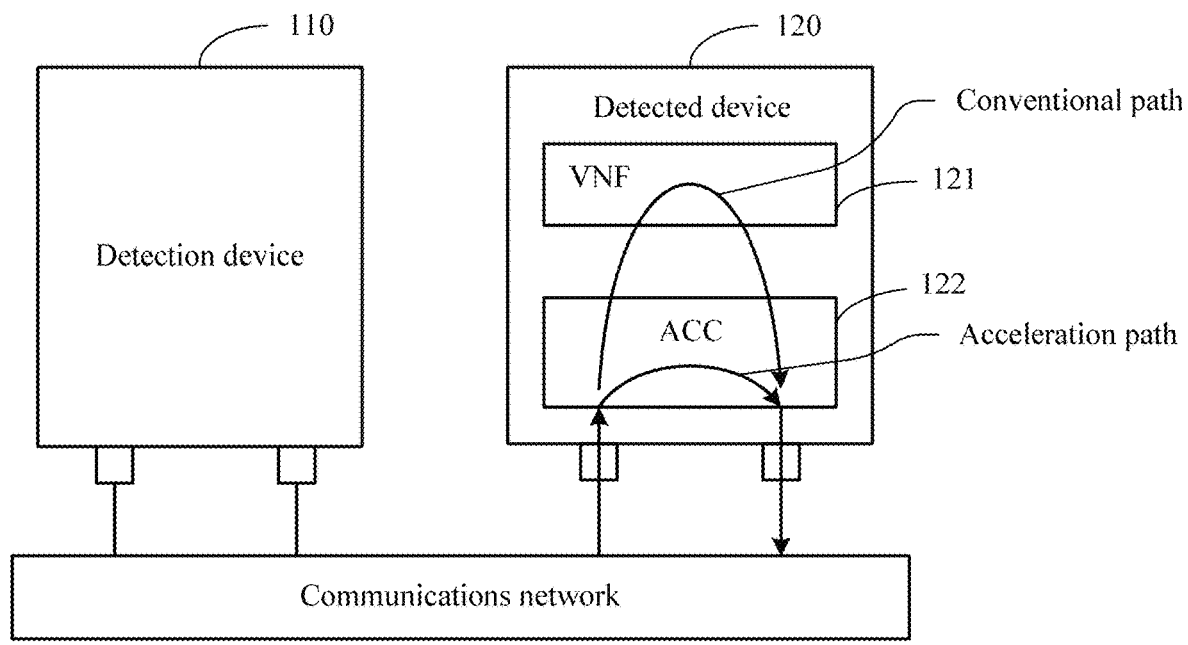
FIG. 1 is a schematic diagram of a networking structure of a detection system according to an embodiment of the present disclosure.

FIG. 1 is a schematic diagram of a networking structure of a detection system according to an embodiment of the present disclosure. The detection system includes a detection device 110 and a detected device 120. The detected device 120 includes a VNF 121 and an accelerator (ACC) 122. The detection device 110 and the detected device 120 may communicate with each other by using a communications network. The communications network may include a virtual switch (vSwitch) or a top-of-rack (TOR) switch.

The VNF 121 usually runs in a form of software on a virtual machine of a network function virtualization (NFV) system. To ensure normal running of a VNF with relatively high hardware resource consumption, an ACC is usually used to accelerate the VNF.

The VNF 121 may be a virtual router, a virtual firewall, or an OpenFlow switch. It should be noted that, a VNF and an accelerator that accelerates the VNF may be referred to as one network device as a whole, and usually, the network device may also be referred to as a VNF having an accelerator. The VNF and the accelerator that accelerates the VNF may be located on a same physical server, or may be located on different physical servers. In addition, a plurality of VNFs and accelerators corresponding to the plurality of VNFs may be deployed on a same physical server, and each VNF and an accelerator corresponding to the VNF form one network device. When the network device 120 receives a packet, the packet may be processed and forwarded by using the ACC, or may be processed and forwarded by using the VNF.

The detection device 110 may be a device currently not participating in a network service, such as a cold backup device, or a device used for fault detection.

Alternatively, the detection device 110 may be a device currently participating in a network service, such as a routing device that is performing packet routing.

The "participating in a network service" in this embodiment of the present disclosure refers to receiving a packet of a network service and processing the received packet.

When the detected device 120 receives a packet through a physical port (referred to as an ingress port), the packet may be processed by using the accelerator 122 and forwarded through another physical port (referred to as an egress port), or may be processed by using the VNF 121 and forwarded through the egress port. Generally, for a data flow that has been identified (in other words, a packet of the data flow has been processed by the detected device), if a forwarding table of the accelerator 122 has an entry corresponding to the data flow, the packet of the data flow is processed and forwarded by the accelerator 122. For a new data flow that has not been identified (in other words, a packet of the data flow has not been processed by the detected device), if the forwarding table of the accelerator 122 does not have an entry corresponding to the data flow, the packet of the data flow is processed and forwarded by the VNF 121. For ease of description, in the following, a path from the ingress port to the egress port via the VNF 121 is referred to as a conventional path, and a path from the ingress port to the egress port via the accelerator 122 is referred to as an acceleration path.

The detected device 120 includes the VNF 121 and the accelerator 122. When fault detection is performed in some approaches, if one path of the path for forwarding the packet by using the VNF and the path for forwarding the packet by using the accelerator 122 is faulty and the other path is not faulty, the detection device can still receive a detection packet returned by the network device, and determine that the network device is not faulty. As a result, a detection result is not accurate.

The embodiments of the present disclosure provide a method and a system for implementing fault detection, and an apparatus, to improve fault detection accuracy.

The following describes a method 100 provided in Embodiment 1 of the present disclosure with reference to FIG. 1 to FIG. 4A and FIG. 4B.

Figure 2:
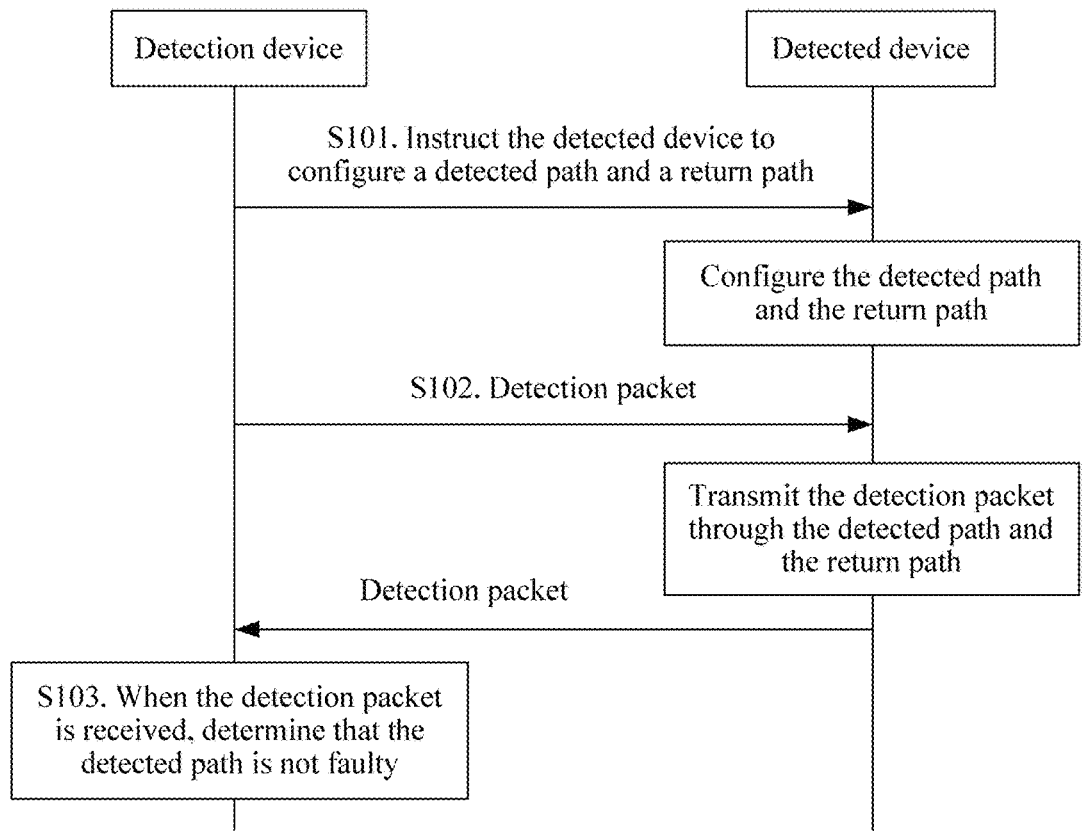
FIG. 2 is a schematic flowchart of a method 100 according to Embodiment 1 of the present disclosure.

FIG. 2 is a schematic flowchart of the method according to Embodiment 1 of the present disclosure. The method in Embodiment 1 of the present disclosure may be applied to the detection system shown in FIG. 1 and performed by a detection device (for example, the detection device 110 shown in FIG. 1).

As shown in FIG. 2, the method 100 includes the following steps.

S101. The detection device instructs a detected device (for example, the detected device 120 shown in FIG. 1) to configure a detected path and a return path.

Correspondingly, the detected device configures the detected path and the return path according to an indication of the detection device. The detected path is a path from a first physical port of the detected device to a second physical port via a target unit. The target unit includes a VNF of the detected device or an accelerator of the detected device. A forwarding table of the target unit is referred to as a target forwarding table. The return path is a path from the second physical port to the detection device.

When the target unit is the VNF, the detected path is a conventional path. When the target unit is the accelerator, the detected path is an acceleration path.

It should be noted that the detected device may include a plurality of physical ports. When a fault of a path from one of the plurality of physical ports (referred to as a physical port A) to another physical port (referred to as a physical port B) needs to be detected, the physical port A is referred to as a first physical port, and the physical port B is referred to as a second physical port. Correspondingly, when a fault of a path from the physical port B to the physical port A needs to be detected, the physical port B is referred to as a first physical port, and the physical port A is referred to as a second physical port.

The detection device may communicate with the detected device through the first physical port and the second physical port that are of the detected device. In subsequent S102 and S103, a complete transmission path of a detection packet sent by the detection device includes a first path from the detection device to the first physical port of the detected device, and the detected path and the return path that are set in S101. If there is no fault on the detected path and the first path, the detection packet is transmitted to the detection device through the return path.

During specific implementation, the detected device may further configure the detected path and the return path according to an indication of another device (for example, a gateway device), or an administrator may directly configure the detected path and the return path on the detected device, that is, the detected device configures the detected path and the return path according to an operation of the administrator. In the subsequent description, only an example in which the detection device instructs the detected device to configure the detection path and the return path is used. A configuration manner according to the indication of another device or the operation of the administrator is similar to a configuration manner according to the indication of the detection device. Details are not described again.

S102. The detection device sends a detection packet to the first physical port of the detected device.

Correspondingly, the detected device receives the detection packet from the first physical port of the detected device, and transmits the detection packet to the detection device through the detected path and the return path.

S103. When receiving the detection packet transmitted through the detected path and the return path, the detection device determines that the detected path is not faulty.

If not receiving the detection packet, the detection device may determine that the transmission path of the detection packet is faulty. The transmission path includes the first path from the detection device to the first physical port of the detected device, the detected path, and a second path (that is, the return path) from the second physical port of the detected device to the detection device. In addition, the first path and the second path may be kept unchanged, and detection is performed on the transmission path once when the detected path is the conventional path, and detection is performed on the transmission path once when the detected path is the acceleration path. If the transmission path is not faulty for one time and is faulty for another time, because the first path and the second path are unchanged, it may be determined that a fault on the faulty transmission path occurs on the detected path included in the transmission path. It is assumed that a first transmission path includes the first path from the detection device to the first physical port of the detected device, a first detected path, and the second path from the second physical port of the detected device to the detection device. The first detected path is a path from the first physical port of the detected device to the second physical port via the VNF of the detected device. It is assumed that a second transmission path includes the first path from the detection device to the first physical port of the detected device, a second detected path, and the second path from the second physical port of the detected device to the detection device. The second detected path is a path from the first physical port of the detected device to the second physical port via the accelerator of the detected device. After separately detecting the first transmission path and the second detection path, if determining that the first transmission path is faulty but the second transmission path is not faulty, the detection device determines that the first detected path on the first transmission path is faulty. Similarly, after separately detecting the first transmission path and the second detection path, if determining that the second transmission path is faulty but the first transmission path is not faulty, the detection device determines that the second detected path on the second transmission path is faulty.

In Embodiment 1 of the present disclosure, the detection packet may be transmitted between the detection device and the detected device through a layer-2 network. Correspondingly, in S102, a MAC address of the detection packet sent by the detection device is a MAC address of the first physical port of the detected device. Alternatively, the detection packet may be transmitted between the detection device and the detected device through a layer-3 network. Correspondingly, in S102, a destination IP address of the detection packet sent by the detection device is an IP address of the first physical port of the detected device.

According to the method 100 provided in Embodiment 1 of the present disclosure, it can be further determined whether the path that passes through the VNF or the accelerator and that is in the detected device is faulty, thereby improving fault detection accuracy.

Figure 3A:
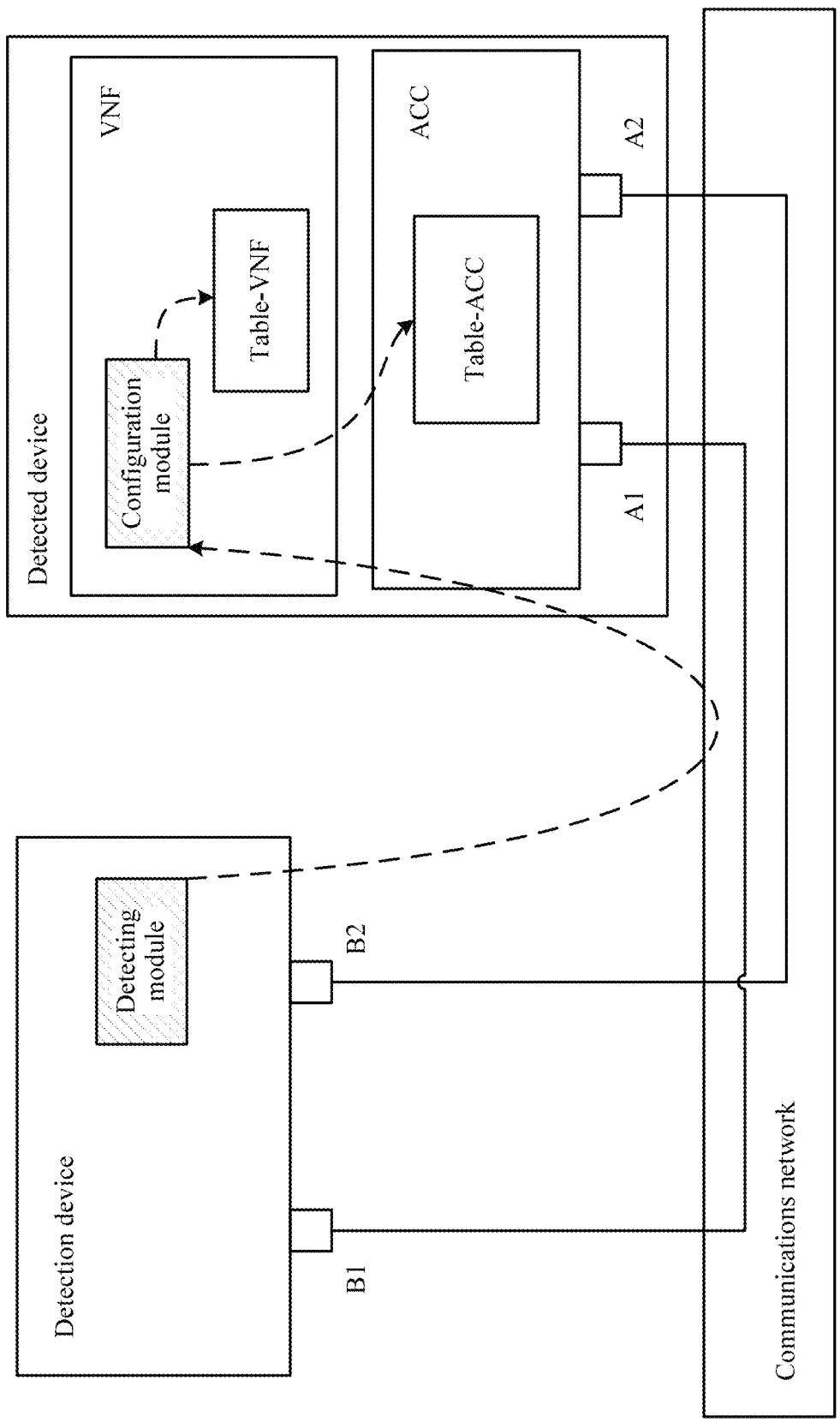
FIGS. 3A, FIG. 3B, and FIG. 3C are schematic diagrams of detection packet forwarding according to Embodiment 1 of the present disclosure.
Figure 3B:
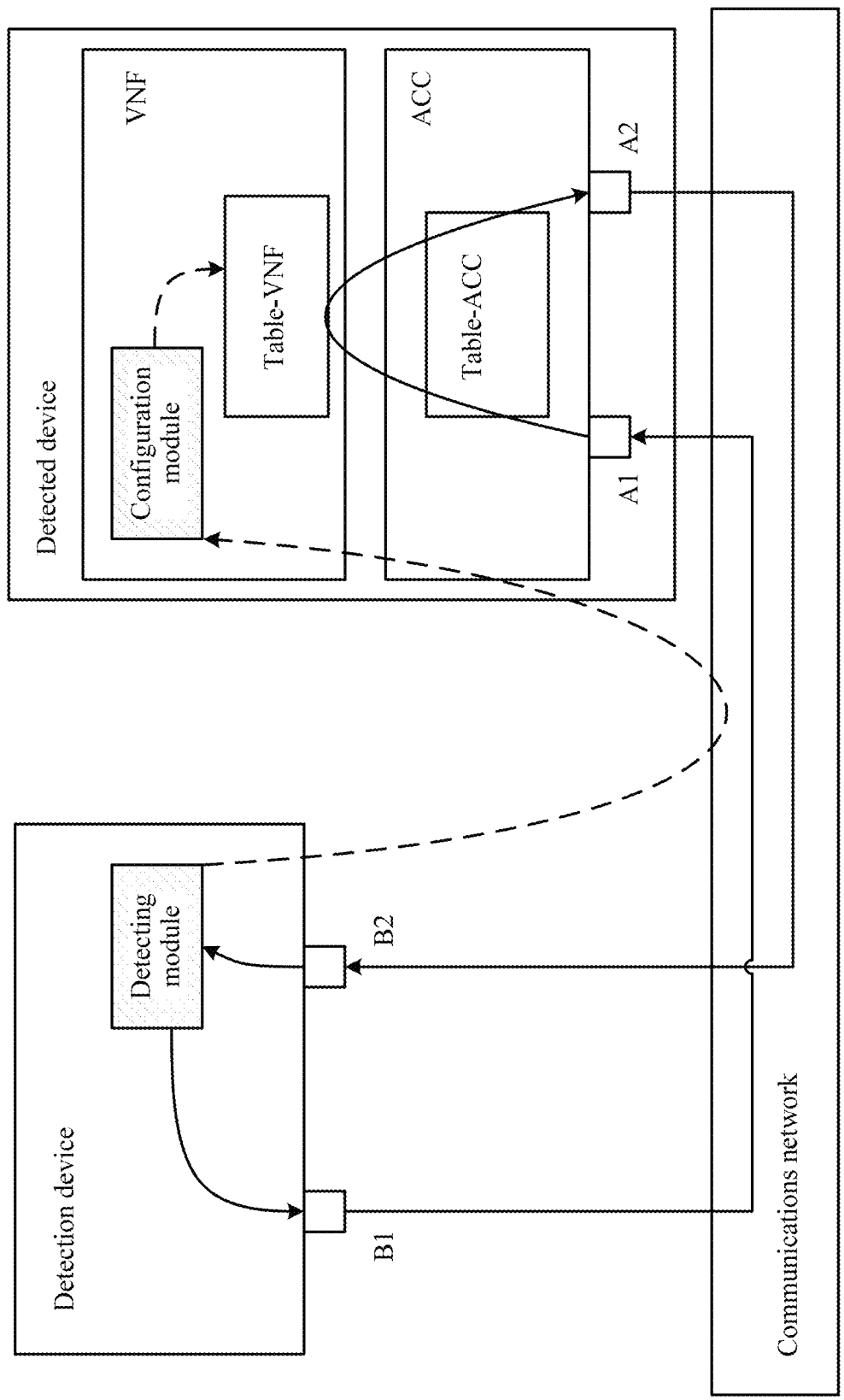
Figure 3C:
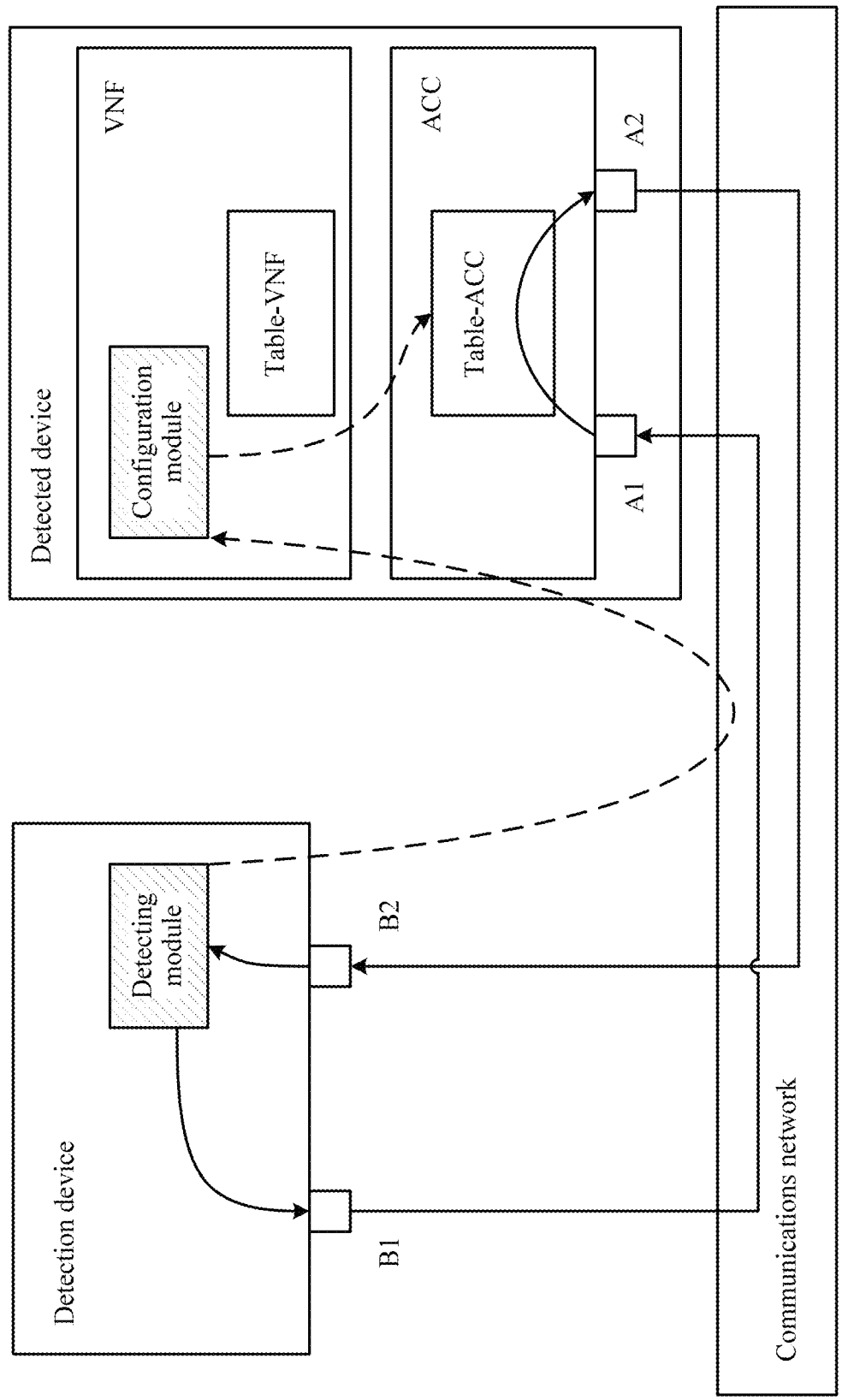

The following describes specific implementations of Embodiment 1 of the present disclosure with reference to FIG. 3A to FIG. 3C.

In S101, the detection device may instruct the detected device to configure a detection entry into the target forwarding table, to implement configuration of the detected path and the return path.

The target forwarding table may be a forwarding table of the target unit, that is, a forwarding table of the VNF of the detected device or a forwarding table of the accelerator of the detected device. To be specific, when the detected path is the conventional path, the target forwarding table is the forwarding table of the VNF of the detected device; or when the detected path is the acceleration path, the target forwarding table is the forwarding table of the accelerator of the detected device.

The detection entry is used to instruct to: when a packet matching the detection entry is received, change a destination address of the packet to an address of the detection device, and send the packet through the second physical port of the detected device.

In an embodiment, the detection entry may be used to instruct to: when a packet matching the detection entry is received, change a destination IP address of the packet to a destination IP address of the detection device, and send the packet through the second physical port of the detected device.

In another embodiment, the detection entry may also be used to instruct to: when a packet matching the detection entry is received, change a destination MAC address of the packet to a destination MAC address of the detection device, and send the packet through the second physical port of the detected device.

The target forwarding table includes a match field and an action field corresponding to the match field. The detection entry configured into the target forwarding table includes a value corresponding to the match field and a value corresponding to the action field. Correspondingly, the foregoing "matching the detection entry" refers to matching the value of the match field in the detection entry.

It is assumed that the detected device forwards a packet based on a 5-tuple (that is, a source IP address (SIP), a destination IP address (DIP), a Protocol, a source port number (Sport), and a destination port number (DPort)), the IP address of the detection device is IP_1, the MAC address of the detection device is MAC_B2, and the second physical port of the detected device is A2. As shown in Table 1, the value of the match field of the detection entry is <*, IP_1, *, *, *>, and the value of the action field of the detection entry is "Output A2; DMAC=MAC_B2". The detection entry instructs to change a destination MAC address of a packet whose destination IP address is IP_1 to MAC_B2, and forward the packet through the second physical port A2. It should be noted that, for ease of description, in an example described in Table 1, only a value of the DIP is set to a specific value, and values of other match fields are all wildcard characters. Actually, values of some or all of the other match fields may also be set to specific values or values including wildcard characters, provided that the detection packet sent in S102 can match the detection entry. In addition, it should be noted that the source port number and the destination port number in the 5-tuple refer to port numbers of transport layer ports.

TABLE 1

| Match field<br>< SIP, DIP, Protocol, SPort, DPort > | Action field |
|---|---|
| < *, TP_1, *, *, * > | Output A2; DMAC = MAC_B2 |
| ... | ... |

The detection device may construct the detection entry and instruct the detected device to configure, into the target forwarding table, the detection entry constructed by the detection device, or may send information used for constructing the detection entry to the detected device and instruct the detected device to: construct the detection entry based on the information used for constructing the detection entry, and configure the constructed detection entry into the target forwarding table. The information used for constructing the detection entry includes information used for describing the value corresponding to the match field and information used for describing the value corresponding to the action field.

A specific implementation in which the detection device instructs the detected device to configure the detection entry into the target forwarding table may be as follows: The detection device sends a control packet to the detected device. The control packet includes a target forwarding table indicator, and further includes the detection entry constructed by the detection device or the information used for generating the detection entry. The target forwarding table indicator is used to indicate that the target forwarding table is the forwarding table of the VNF or the forwarding table of the accelerator.

For an implementation in which the control packet includes the detection entry constructed by the detection device, the detected device configures, into the target forwarding table based on the control packet, the detection entry included in the control packet.

For an implementation in which the control packet includes the information used for generating the detection entry, the detected device generates the detection entry based on the information used for generating the detection entry, and configures the detection entry into the target forwarding table.

In an implementation, after successfully configuring the detection entry into the target forwarding table, the detected device may return, to the detection device, a packet used for indicating that the configuration succeeds.

As shown in FIG. 3A, a detection module may be deployed in the detection device to implement detection functions in Embodiment 1 of the present disclosure, including constructing of the detection entry, constructing and sending of the detection packet, and the like. Correspondingly, a configuration module may be deployed in the VNF of the detected device to implement configuration of the detection entry according to an instruction of the detection module.

For example, the detection module constructs the detection entry. After constructing the detection entry, the detection module instructs the configuration module to configure the detection entry into the target forwarding table. The target forwarding table may be the forwarding table of the VNF (for example, a Table-VNF shown in FIG. 3A) or the forwarding table of the accelerator (for example, a Table-ACC shown in FIG. 3A). After constructing the detection entry, the detection module encapsulates the detection entry in a control packet, and sends the control packet to the configuration module of the VNF via a communication link between a management port (for example, a loopback port) of the detection device and a management port (for example, a loopback port) of the VNF of the detected device. The control packet further includes the target forwarding table indicator. The target forwarding table indicator is used to instruct the configuration module to configure the detection entry into the forwarding table of the VNF or the forwarding table of the accelerator. For example, when a value of the target forwarding table indicator is Table-VNF, the target forwarding table indicator is used to instruct to configure the detection entry into the Table-VNF, or when a value of the target forwarding table indicator is Table-ACC, the target forwarding table indicator is used to instruct to configure the detection entry into the Table-ACC.

The configuration module configures the detection entry into the target forwarding table according to an instruction of the detection module.

In this application, a packet other than the detection packet in packets processed by the detected device is referred to as a service packet. An entry included in the forwarding table of the VNF or the forwarding table of the accelerator before the detection entry is configured is referred to as an existing entry.

During specific implementation, the detected device may be a device currently participating in a network service, or may be a device currently not participating in a network service.

When fault detection is performed on a device currently not participating in a network service, because the detected device currently does not participate in the network service, there is no need to consider impact of a detection entry on a service packet during construction of the detection entry. If it is ensured that no entry exists in the detected device before detection, there is no need to consider impact of an existing entry on a detection packet during detection either.

When fault detection is performed on a device currently participating in a network service, impact of an existing entry on a detection packet needs to be avoided to further improve fault detection accuracy.

To avoid the impact of the existing entry on the detection packet, generally, the detection entry needs to meet one of the following conditions:

Condition 1: The detection packet matching the detection entry does not match any existing entry.

Condition 2: A priority of the detection entry is higher than a priority of any existing entry that can match the detection packet.

During specific implementation, a value of a detection match field in the detection entry may be set, to enable the detection entry and the detection packet to meet Condition 1 or Condition 2. The detection match field is some or all match fields in a forwarding table of the detected device.

In Embodiment 1 of the present disclosure, the detecting match field is a match field that may be set to a corresponding value to enable the detection entry and the detection packet to meet Condition 1 or Condition 2. If the detection match field is the some match fields in the forwarding table of the detected device, a match field other than the detection match field in the detection entry may be set to any value, provided that the detection packet sent in S102 can match the detection entry.

It should be noted that, because a matching field in the forwarding table of the VNF is completely same as a matching field in the forwarding table of the ACC, a matching field in the forwarding table of the detected device may be described as any one of the following expressions: a matching field in a forwarding table of the detected device, a matching field in the target forwarding table, the matching field in the forwarding table of the VNF, and the matching field in the forwarding table of the ACC.

The following separately describes a specific implementation for avoiding the impact of the existing entry on the detection packet by using Implementation A and Implementation B.

Implementation A: The detection entry is constructed by using some or all exact match fields in the forwarding table of the detected device as the detection match field.

Implementation A is applicable to a case in which all or some match fields in the forwarding table of the detected device are exact match fields. An exact match field refers to a match field whose value includes no wildcard character.

It is assumed that a forwarding table of the detected device includes N exact match fields (N≥1), and the detection entry may be constructed in the following manner. The detection match field includes M match fields in the N exact match fields, where M≤N. Correspondingly, the detection entry and the detection packet are enabled to meet the foregoing condition (for example, Condition 1) by using a value corresponding to the M match fields in the detection entry and a value of a header field corresponding to the M match fields in the detection packet. For example, the match field in the target forwarding table includes SIP, DIP, Protocol, SPort, and DPort, and any one of DIP, SPort, and DPort is an exact match field. DIP may be selected as the detection match field, or SPort and/or DPort may be selected as the detection match field.

When M is equal to 1, a value corresponding to the M match fields in the detection entry is different from a value corresponding to the M match fields in any existing entry. For example, if DIP is selected as the detection match field, a destination IP of the detection packet is 192.168.1.1, the detection entry is <*,192.168.1.1,*,*,*>, and a destination IP address in any existing entry is not 192.168.1.1.

When M is greater than or equal to 2, a combination of values corresponding to the M match fields in the detection entry is different from a combination of values corresponding to the M match fields in any existing entry. For example, a combination of SPort and DPort is used as the detection match field, a source port number of the detection packet is 100, a destination port number of the detection packet is 101, the detection entry is <*,*,*,100,101>, and the existing entry of the detected device does not have an entry whose source port number is 100 and whose destination port number is 101.

The existing entry usually includes an entry that matches the service packet. The value or the combination of values corresponding to the M exact match fields in the detection entry is different from the value or the combination of values corresponding to the M match fields in any existing entry. Certainly, a service packet that can match the existing entry does not match the detection entry. In this way, not only impact of the existing entry on the detection packet can be avoided, but also impact of the detection entry on the service packet can be avoided.

Implementation B: The detection entry is constructed by using some or all wildcard match fields in the forwarding table of the detected device as the detection match field.

Implementation B is applicable to a case in which all or some match fields in the forwarding table of the detected device are wildcard match fields. A wildcard match field is a match field whose value may include a wildcard character. For example, if the match field DIP is a wildcard match field, a value of DIP may be 192.168.1.1, may be 192.168.1.*, or may be *.

It is assumed that a forwarding table of the detected device includes J wildcard match fields (J≥1), and the detection entry may be constructed in the following manner.

The detection match field includes K match fields in the J wildcard match fields, where K≤J. Correspondingly, the detection entry and the detection packet are enabled to meet the foregoing condition (for example, Condition 2) by using a value corresponding to the K match fields in the detection entry and a value of a header field corresponding to the K match fields in the detection packet.

In Embodiment B of the present disclosure, for example, an IP address match field in the target forwarding table matches a packet according to a matching rule of longest prefix matching (LPM). Packet matching may also be performed according to another matching rule, provided that the Condition 1 or Condition 2 can be met.

The value corresponding to the K match fields in the detection entry and the value of the header field corresponding to the K match fields in the detection packet may be set, so that a matching degree between the detection packet and the detection entry is higher than a matching degree between the detection packet and each existing entry.

In an implementation, the value corresponding to the K match fields in the detection entry is a value that includes no wildcard character.

If K is equal to 1, a value corresponding to the K match fields in the detection entry is different from a value corresponding to the K match fields in any existing entry. For example, a destination IP of the detection packet is 192.168.1.1, a destination IP address in the detection entry is 192.168.1.1, and a destination IP address in each existing entry is a value that includes a wildcard character (such as 192.168.*.*) or a value that is different from 192.168.1.1 and that includes no wildcard character (such as 192.133.1.2). If the detection entry matches the detection packet, and none of existing entries match the detection packet, or each existing entry matches the detection packet but the longest prefix that is matched for the IP address match field is shorter than the longest prefix that is matched in the detection entry, it may be considered that the matching degree between the detection packet and the detection entry is higher than the matching degree between the detection packet and the existing entry.

If K is greater than or equal to 2, a combination of values corresponding to the K match fields in the detection entry is different from a combination of values corresponding to the K match fields in any existing entry, the detection entry matches the detection packet, and none of existing entries match the detection packet, and it may be considered that the matching degree between the detection packet and the detection entry is higher than the matching degree between the detection packet and each existing entry.

The existing entry usually includes an entry that matches the service packet. The value corresponding to the K match fields in the detection entry includes no wildcard character. The value or the combination of the values corresponding to the K match fields in the detection entry is different from the value or the combination of the values corresponding to the K match fields in any existing entry. Certainly, a service packet that can match the existing entry does not match the detection entry. In this way, not only impact of the existing entry on the detection packet can be avoided, but also impact of the detection entry on the service packet can be avoided.

In another implementation, the value of the K match fields in the detection entry is a value that includes a wildcard character. A matching degree between the detection packet and the value corresponding to the K match fields in the detection entry is higher than a matching degree between the detection packet and the value corresponding to the K match fields in each existing entry. For example, a destination IP of the detection packet is 192.168.1.1, a destination IP address in the detection entry is 192.168.1.*, and a destination IP address in each existing entry is 192.168.*.*. According to a rule of longest prefix matching, the existing entry matches the detection packet but the longest prefix obtained by matching the IP address match field is shorter than the longest prefix obtained by matching the detection entry. Therefore, the matching degree between the detection packet and the destination IP address in the detection entry is higher than the matching degree between the detection packet and the destination IP address in each existing entry.

It should be noted that if some match fields in the forwarding table of the detected device are wildcard match fields, and some match fields in the forwarding table of the detected device are exact match fields, a combination of some or all exact match fields and some or all wildcard match fields that are in the forwarding table of the detected device may be used as the detection match field to construct the detection entry, provided that Condition 1 or Condition 2 can be met.

To avoid impact of the existing entry on the detection packet, the value corresponding to the detection match field in the detection entry and a value corresponding to the detection match field in the detection packet may be generally set to values that do not exist in the forwarding table of the detected device. The value of the detection match field may be set by using the following several example implementations.

Example Implementation 1

The detection match field may include a source IP address. A value corresponding to the source IP address in the detection entry is an IP address that does not participate in network communication or an IP address segment that does not participate in network communication, for example, an IP address that is of the detection device and that is not used for communicating with another device. And/or, the detection match field may include a destination IP address. A value corresponding to the destination IP address in the detection entry is an IP address that does not participate in network communication or an IP address segment that does not participate in network communication, for example, an IP address that is of the detection device and that is not used for communicating with another device.

For example, the detection device is a cold backup device (for example, a cold backup device of the detected device). In this case, the source IP address and/or the destination IP address may be used as the detection match field, and an IP address of the cold backup device may be used as the value of the source IP address and/or the destination IP address that is of the detection entry. The IP address of the cold backup device usually does not participate in network communication, and the forwarding table of the detected device usually does not have an entry that includes the IP address of the cold backup device. Therefore, impact of the existing entry on the detection packet can be avoided, and fault detection accuracy is improved. During specific implementation, some IP addresses of the cold backup device may also participate in the network communication. For example, the cold backup device may need to exchange a control packet (for example, a heartbeat packet) with an active device corresponding to the cold backup device. As a result, an IP address used by the cold backup device to transmit the control packet may appear in the forwarding table of the detected device. Therefore, to further avoid the impact of the existing entry on the detection packet, the IP address that is of the cold backup device and that is not used for communicating with another device may be used as the value of the source IP address of the detection entry and/or the destination IP address of the detection entry.

It should be noted that, to ensure that the detection packet that can match the detection entry is normally sent to the first physical port, the IP address that does not participate in the network communication can be used as the value of the destination IP address of the detection entry only when the detection packet is sent between the detection device and the detected device through the layer-2 network.

Example Implementation 2

The detection device may further obtain, from the detected device, a value or a combination of values that do not exist in the forwarding table of the detected device (referred to as a first detection value below), use a match field corresponding to the first detection value as the detection match field, and set the first detection value to the first detection value. Because any existing entry in the forwarding table of the detected device does not include the first detection value, impact of the existing entry on the detection packet can be avoided, thereby improving fault detection accuracy.

Further, values of all match fields in the detection entry may be further set to values that do not include wildcard characters, so as to reduce a possibility of matching the service packet with the detection entry, thereby avoiding impact of the detection entry on the service packet.

Before instructing the detected device to configure the detection entry into the target forwarding table, the detection device may first obtain a structure of a target forwarding table of the detected device, in other words, determine which match fields are included in the target forwarding table of the detected device, so that the detection device constructs a detection entry that meets the structures of the target forwarding tables. The detection device may further obtain information used to describe whether a match field is a wildcard match field or an exact match field, or information used to indicate which match fields are the detection match field, so as to more conveniently construct a detection entry that meets Condition 1 or Condition 2.

It should be noted that a standby device of the detected device may be used as the detection device. If the detection device is the standby device of the detected device, a match field in a target forwarding table of the detection device is exactly the same as that of the detected device. Correspondingly, the detection device may directly obtain information about a match field of the detected device. Otherwise, the detection device may obtain information about the target forwarding table of the detected device from the detected device.

After the detection entry is configured into the target forwarding table in S101, S102 may be implemented in the following manner.

If the detection packet is transmitted between the detection device and the detected device through the layer-2 network, the detection packet sent in S102 meets the following condition: A header field of the detection packet includes information that matches the detection entry, and a destination MAC address of the detection packet is the MAC address of the first physical port of the detected device.

If the detection packet may be transmitted between the detection device and the detected device through the layer-3 network, the detection packet sent in S102 meets the following condition: The detection packet includes information that matches the detection entry, and a destination IP address of the detection packet is the IP address of the first physical port of the detected device. The information that matches the detection entry is carried in a header field of the detection packet.

For example, the following describes in detail that the detection packet is transmitted between the detection device and the detected device through the layer-2 network.

For example, the detection match field includes DIP, and the value that is set in S101 and that is of the destination IP address in the detection entry is the IP address of the detection device. The detection entry is further used to instruct to: when a packet whose destination IP address is the IP address of the detection device is received, change a destination MAC address of the packet to the MAC address of the detection device, and send the packet through the second physical port of the detected device. Correspondingly, the destination IP address of the header field of the detection packet sent in S102 is the IP address of the detection device.

According to this implementation, it may be ensured that the detection packet is transmitted along the detected path and the return path.

It is assumed that the IP address of the detection device is IP_1, the MAC address of the detection device is MAC_B2, the second physical port of the detected device is A2, a configured detection entry is shown in Table 1, and the value of the header field of the detection packet may be shown in Table 2.

TABLE 2

| SMAC | DMAC | SIP | DIP | Another field |
|---|---|---|---|---|
| MAC_B1 | MAC_A1 | Any value | IP_1 | Any value |

The detection device sends the detection packet through a physical port B1 corresponding to a source MAC address of the detection packet. Because a physical port corresponding to the destination MAC address of the detection packet is a physical port A1 of the detected device, the detection packet is forwarded to the physical port A1 of the detected device through the layer-2 network.

Case 1: The detection entry is configured in the forwarding table of the VNF. If the conventional path is not faulty, a forwarding process of the detection packet is further shown in FIG. 3B.

First, the detection packet is forwarded to the accelerator of the detected device for processing. Because an entry that can match information about the detection packet does not exist in the forwarding table of the accelerator, the accelerator forwards the detection packet to the VNF of the detected device. Because the destination IP address of the detection packet is IP_1, and matches the detection entry, the VNF changes the destination MAC address of the detection packet to MAC_B2 according to the detection entry, and forwards the detection packet through the physical port A2. Further, because the destination MAC address of the detection packet has been changed to the MAC address MAC_B2 of the detection device, and a physical port corresponding to MAC_B2 is a physical port B2 of the detection device, the detection packet is forwarded to the physical port B2 of the detection device through the layer-2 network.

Case 2: The detection entry is configured in the forwarding table of the accelerator. If the acceleration path is not faulty, a forwarding process of the detection packet is shown in FIG. 3C.

The detection packet is forwarded to the accelerator of the detected device for processing. Because the destination IP address of the detection packet is IP_1 and matches the detection entry, the VNF changes the destination MAC address of the detection packet to MAC_B2 according to the detection entry, and forwards the detection packet through the physical port A2. Further, because the destination MAC address of the detection packet has been changed to the MAC address MAC_B2 of the detection device, and a physical port corresponding to MAC_B2 is a physical port B2 of the detection device, the detection packet is forwarded to the physical port B2 of the detection device through the layer-2 network.

Figure 4A:
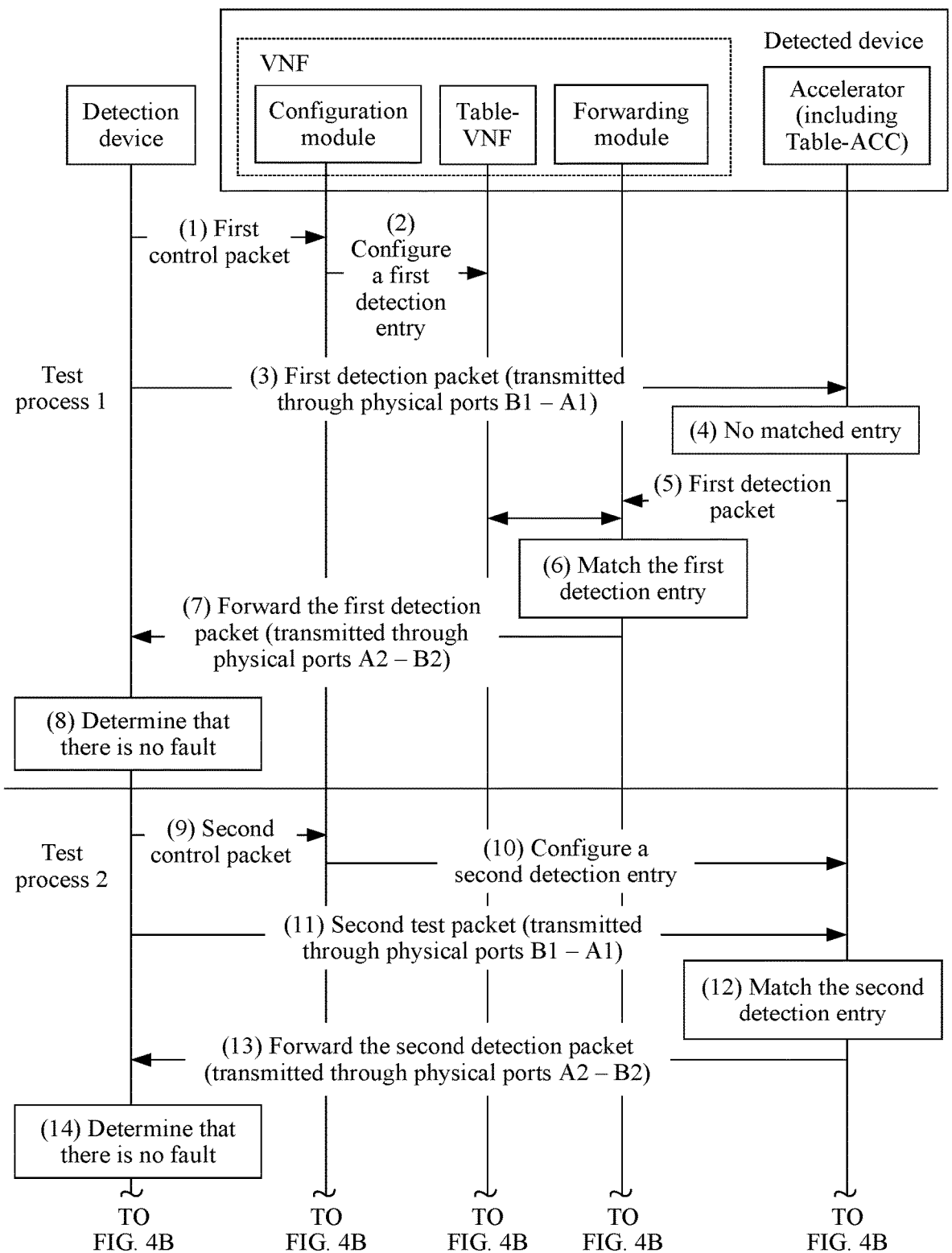
FIG. 4A and FIG. 4B are schematic diagrams of a detection process according to Embodiment 1 of the present disclosure.
Figure 4B:
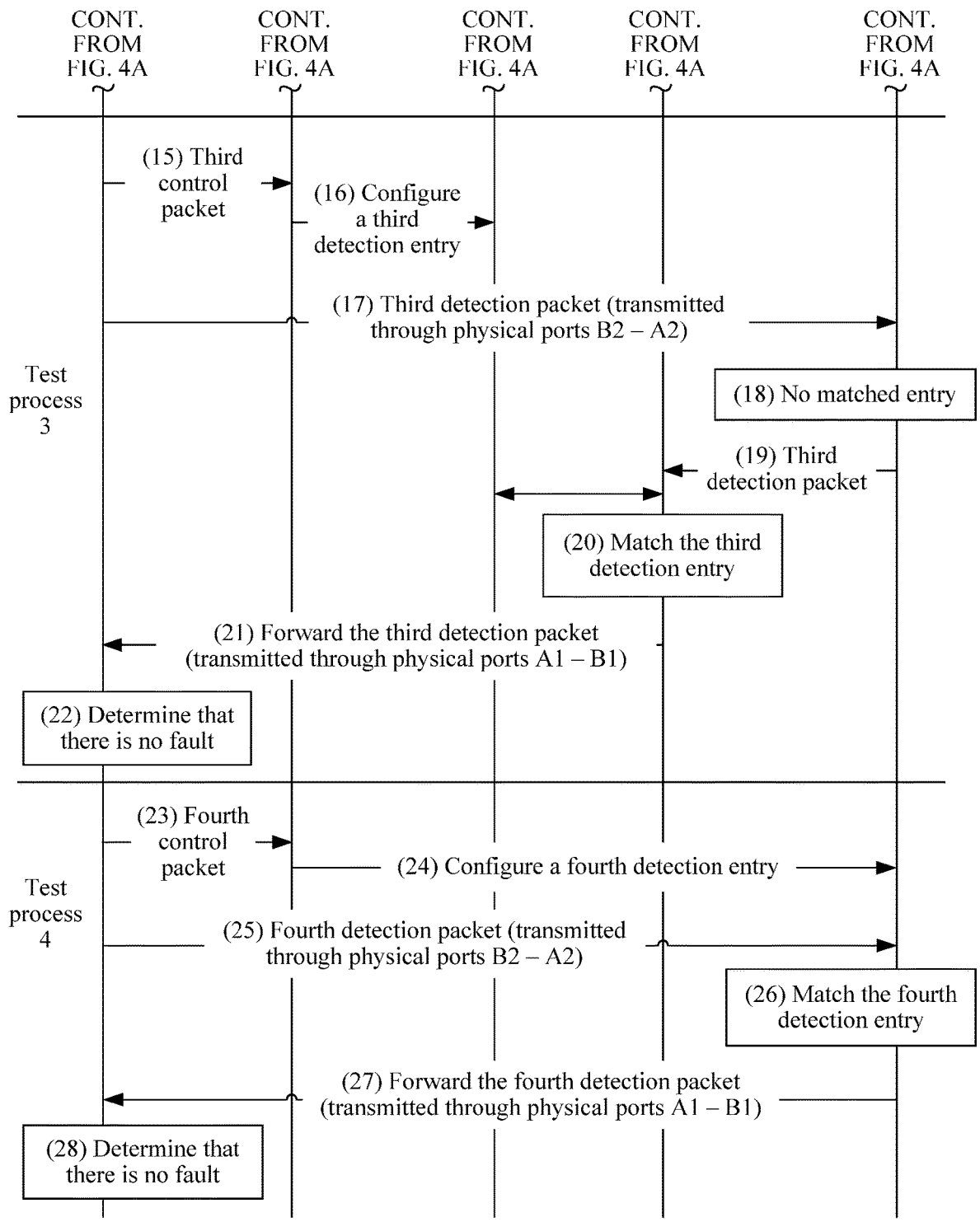

During specific implementation, any path in the detected device may be detected by using S101 to S103. As shown in FIG. 4A and FIG. 4B, the following paths may be separately detected: a path from the physical port A1 to A2 via the accelerator, a path from the physical port A1 to A2 via the VNF, a path from the physical port A2 to A1 via the accelerator, and a path from the physical port A2 to A1 via the VNF.

The four paths between the two physical ports of the detected device may be detected in the following manner.

It is assumed that the detected device performs packet forwarding based on a 5-tuple (that is, SIP, DIP, Protocol, SPort, and DPort), one or more of SIP, Protocol, SPort, and DPort are a wildcard match field, and DIP is an exact match field. It is assumed that the detection device does not participate in service running, has four IP addresses: IP_1, IP_2, IP_3, and IP_4, and needs to detect a path between the physical ports A1 and A2 that are of the detected device.

A detection entry shown in Table 3 may be constructed.

TABLE 3

| Detection entry | Match field | Action field |
|---|---|---|
| First detection entry | < *, IP_1, *, *, * > | Output A2; DMAC = MAC_B2 |
| Second detection entry | < *, IP_2, *, *, * > | Output A2; DMAC = MAC_B2 |
| Third detection entry | < *, IP_3, *, *, * > | Output A1; DMAC = MAC_B1 |
| Fourth detection entry | < *, IP_4, *, *, * > | Output A1; DMAC = MAC_B1 |

A detection packet shown in Table 4 is constructed.

TABLE 4

| Detection packet | SMAC | DMAC | SIP | DIP | Another field |
|---|---|---|---|---|---|
| First detection packet | MAC_B1 | MAC_A1 | Any value | IP_1 | Any value |
| Second detection packet | MAC_B1 | MAC_A1 | Any value | IP_2 | Any value |
| Third detection packet | MAC_B2 | MAC_A2 | Any value | IP_3 | Any value |
| Fourth detection packet | MAC_B2 | MAC_A2 | Any value | IP_4 | Any value |

The first two detection entries are used to detect a path from the physical port A1 to the physical port A2 that are of the detected device. The latter two detection entries are used to detect a path from the physical port A2 to the physical port A1 that are of the detected device.

TABLE 5

| Detection process | Detected path |
|---|---|
| Detection process 1 | A1 - VNF - A2 |
| Detection process 2 | A1 - Accelerator - A2 |
| Detection process 3 | A2 - VNF - A1 |
| Detection process 4 | A2 - Accelerator - A1 |

With reference to FIG. 4A and FIG. 4B, the following describes specific implementations of sequentially performing the four detection processes shown in Table 5.

Detection process 1: In Detection process 1, a transmission path of the detection packet is B1-A1-VNF-A2-B2. If the transmission path is not faulty, it may be determined that the conventional path A1-VNF-A2 of the detected path is not faulty.

Detection process 1 includes step (1) to step (8) shown in FIG. 4A.

Step (1): The detection device sends a first control packet to the configuration module of the detected device.

The first control packet includes the first detection entry shown in Table 3 and the target forwarding table indicator. When a value of the target forwarding table indicator is Table-VNF, the target forwarding table indicator is used to instruct to configure the first detection entry in the forwarding table of the VNF of the detected device.

Step (2): The configuration module configures the first detection entry in the forwarding table of the VNF based on the first control packet.

Step (3) to Step (7): The detection device sends the first detection packet, and the first detection packet is transmitted and returned to the detection device through the path B1-A1-VNF-A 2-B2.

The first detection packet is shown in Table 4.

The detection device sends the first detection packet through a physical port B1 corresponding to a source MAC address of the first detection packet. Because a physical port corresponding to a destination MAC address of the first detection packet is the physical port A1 of the detected device, the first detection packet is forwarded to the physical port A1 of the detected device through the layer-2 network.

The detection packet is forwarded to the accelerator of the detected device for processing. Because an entry including a value same as a value of a match field of the first detection entry does not exist in the forwarding table of the accelerator, in other words, an entry that can match the information about the detection packet does not exist in the forwarding table of the accelerator, the accelerator forwards the detection packet to the VNF of the detected device. Because the destination IP of the detection packet is IP_1, and matches the first detection entry, a forwarding module of the VNF changes the destination MAC address of the first detection packet to MAC_B2 according to the first detection entry, and forwards the first detection packet through the physical port A2. Further, because the destination MAC address of the first detection packet has been changed to the MAC address MAC_B2 of the detection device, and the physical port corresponding to MAC_B2 is the physical port B2 of the detection device, the first detection packet is forwarded to the physical port B2 of the detection device through the layer-2 network.

Step (8): When successfully receiving the first detection packet, the detection device determines that the transmission path B1-A1-VNF-A2-B2 is not faulty, and may further determine that the detected path A1-VNF-A2 is not faulty.

Then, Detection process 2 is performed. In Detection process 2, a transmission path of the detection packet is B1-A1-accelerator-A2-B2. If the transmission path is not faulty, it may be determined that the conventional path A1-accelerator-A2 of the detected path is not faulty.

Detection process 2 includes step (9) to step (14) shown in FIG. 4A.

Step (9): The detection device sends a second control packet to the configuration module of the detected device.

The second control packet includes the second detection entry shown in Table 3 and the target forwarding table indicator. When a value of the target forwarding table indicator is Table-ACC, the target forwarding table indicator is used to instruct to configure the first detection entry in the forwarding table of the accelerator of the detected device.

Step (10): The configuration module configures the second detection entry in the forwarding table of the accelerator based on the second control packet.

Step (11) to Step (13): The detection device sends the second detection packet, and the second detection packet is transmitted and returned to the detection device through the path B1-A1-accelerator-A2-B2.

The second detection packet is shown in Table 4.

The detection device sends the second detection packet through a physical port B1 corresponding to a source MAC address of the second detection packet. Because a physical port corresponding to a destination MAC address of the second detection packet is the physical port A1 of the detected device, the second detection packet is forwarded to the physical port A1 of the detected device through the layer-2 network.

The second detection packet is forwarded to the accelerator of the detected device for processing. Because a destination IP of the second detection packet is IP_2, and matches the second detection entry, a forwarding module of the VNF changes the destination MAC address of the second detection packet to MAC_B2 according to the second detection entry, and forwards the second detection packet through the physical port A2. Further, because the destination MAC address of the second detection packet has been changed to the MAC address MAC_B2 of the detection device, and the physical port corresponding to MAC_B2 is the physical port B2 of the detection device, the second detection packet is forwarded to the physical port B2 of the detection device through the layer-2 network.

Step (14): When successfully receiving the first detection packet, the detection device determines that the transmission path B1-A1-accelerator-A2-B2 is not faulty, and may further determine that the detected path A1-accelerator-A2 is not faulty.

A process of performing Detection process 3 is similar to that of Detection process 1. A process of performing Detection process 4 is similar to that of Detection process 2. Details are not described again.

In a process of sequentially performing fault detection on a plurality of detected paths in the detected device, before performing fault detection on an Xth detected path (where X≥2), the detection device can instruct the detected device to delete a detection entry configured during fault detection on an (X−1)th detected path, so as to avoid impact of the detection entry corresponding to the (X−1)th detected path on a detection packet of the Xth detected path, especially, when a value of a match field in the detection entry corresponding to the (X−1)th detected path is same as a value of a match field in the detection entry corresponding to the Xth detected path. For example, during specific implementation, fault detection can be performed by using only one IP address (for example, IP_1) of the detection device. In this case, values of match fields in the detection entries shown in Table 3 are exactly the same.

It should be noted that if values of match fields in detection entries of different detected paths are the same, when detecting these different detected paths, a same detection packet can be used, provided that the same detection packet can match a corresponding detection entry.

Figure 5:
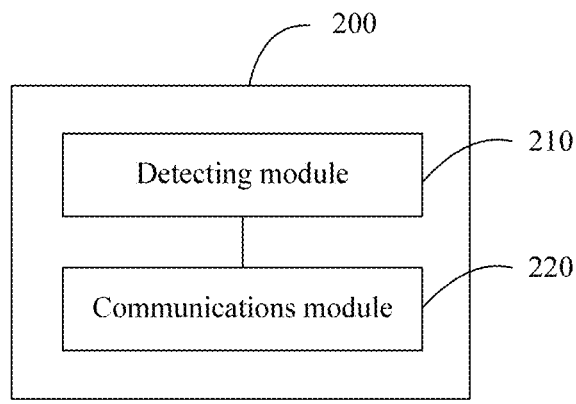
FIG. 5 is a schematic structural diagram of a detection device 200 according to Embodiment 2 of the present disclosure.

According to Embodiment 1 of the present disclosure, Embodiment 2 of the present disclosure provides a detection device 200. As shown in FIG. 5, the detection device 200 includes a detection module 210 and a communications module 220.

The communications module 220 is configured to communicate with a detected device.

The detection module 210 is configured to instruct, by using the communications module 220, the detected device to configure a detected path and a return path. The detected path is a path from a first physical port of the detected device to a second physical port of the detected device via a target unit. The return path is a path from the second physical port to the detection device. The target unit is a VNF of the detected device or an accelerator of the detected device. The detection module 210 is further configured to: send a detection packet to the detected device by using the communications module 220 and through the first physical port of the detected device, and when receiving, by using the communications module 220, the detection packet transmitted through the detected path and the return path, determine that the detected path is not faulty.

A function unit described in Embodiment 2 of the present disclosure may be used to implement operations performed by the detection device 110 in the method in Embodiment 1. The communications module 220 is configured to: send the detection packet to the detected device, receive the detection packet from the detected device, and further configured to send, to the detected device, a control packet used to set a detection entry. The detection module 210 is configured to perform a detection-related function, for example, instruct, by using the communications module 220, the detected device to set the detected path and the return path, send the detection packet to the detected device by using the communications module 220, and when receiving, by using the communications module, the detection packet transmitted through the detected path and the return path, determine that the detected path is not faulty.

According to the detection device 200 provided in Embodiment 2 of the present disclosure, it can be further determined that the path that passes through the VNF or the accelerator and that is in the detected device is not faulty, thereby improving fault detection accuracy.

Figure 6:
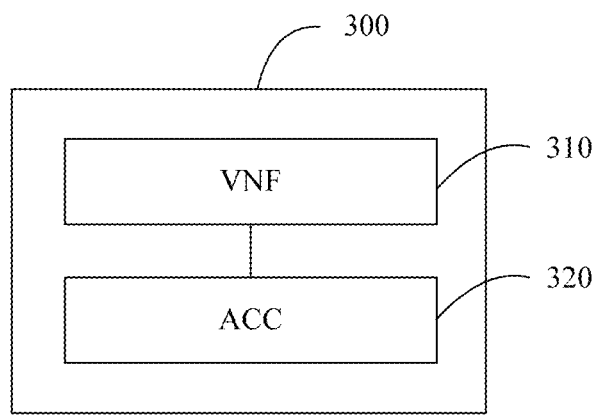
FIG. 6 is a schematic structural diagram of a network device 300 according to Embodiment 3 of the present disclosure.

According to Embodiment 1 of the present disclosure, Embodiment 3 of the present disclosure provides a network device 300. As shown in FIG. 6, the network device 300 includes a VNF 310 and an accelerator 320.

The VNF 310 is configured to configure a detected path and a return path. The detected path is a path from a first physical port of the network device 300 to a second physical port of the network device 300 via a target unit. The return path is a path from the second physical port to the detection device. The target unit is the VNF of the network device 300 or the accelerator 320 of the network device 300. During specific implementation, a configuration module may be disposed in the VNF 310 to perform an operation of configuring a detected path.

When the target unit is the VNF 310, the VNF 310 is further configured to: after receiving a detection packet that is received through the first physical port and that is reported by the accelerator 320, transmit the received detection packet through the detected path and the return path. The VNF 310 performs an operation of transmitting the detection packet by using a forwarding module in the VNF 310.

When the target unit is the accelerator 320, the accelerator 320 is configured to: when receiving the detection packet through the first physical port, transmit the detection packet through the detected path and the return path. Specifically, the accelerator 320 performs an operation of transmitting the detection packet by using a forwarding module in the accelerator 320.

A function unit described in Embodiment 3 of the present disclosure may be used to implement operations performed by the detected device 120 in the method in Embodiment 1. The VNF 310 may be configured to perform an operation performed by the VNF 121 in Embodiment 1, and the accelerator 320 may be configured to perform an operation performed by the accelerator 122 in Embodiment 1.

According to the network device 300 provided in Embodiment 3 of the present disclosure, it can be further determined that the path that passes through the VNF or the accelerator and that is in the detected device is not faulty, thereby improving fault detection accuracy.

Figure 7:
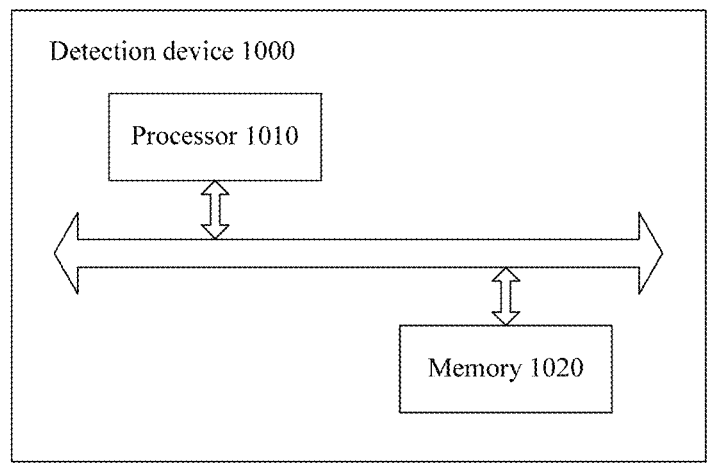
FIG. 7 is a schematic structural diagram of a detection device 1000 according to Embodiment 4 of the present disclosure.

According to Embodiment 1 of the present disclosure, Embodiment 4 of the present disclosure provides a detection device 1000. As shown in FIG. 7, the detection device 1000 includes a processor 1010 and a memory 1020, and the processor 1010 and the memory 1020 complete mutual communication by using a bus.

The memory 1020 is configured to store a computer operation instruction. The memory 1020 may be a random-access memory (RAM) memory or a read-only memory (ROM). The memory 1020 may be a non-volatile RAM (NVRAM).

The processor 1010 is configured to execute the computer operation instruction stored in the memory 1020. The processor 1010 may be a central processing unit (CPU), or an application-specific integrated circuit (ASIC), or be configured as one or more integrated circuits configured to implement this embodiment of the present disclosure.

The processor 1010 executes the computer operation instruction, so that the detection device 1000 performs operations executed by the detection device 110 in the method in Embodiment 1.

According to the detection device 1000 provided in Embodiment 4 of the present disclosure, it can be further determined that the path that passes through the VNF or the accelerator and that is in the detected device is not faulty, thereby improving fault detection accuracy.

Figure 8:
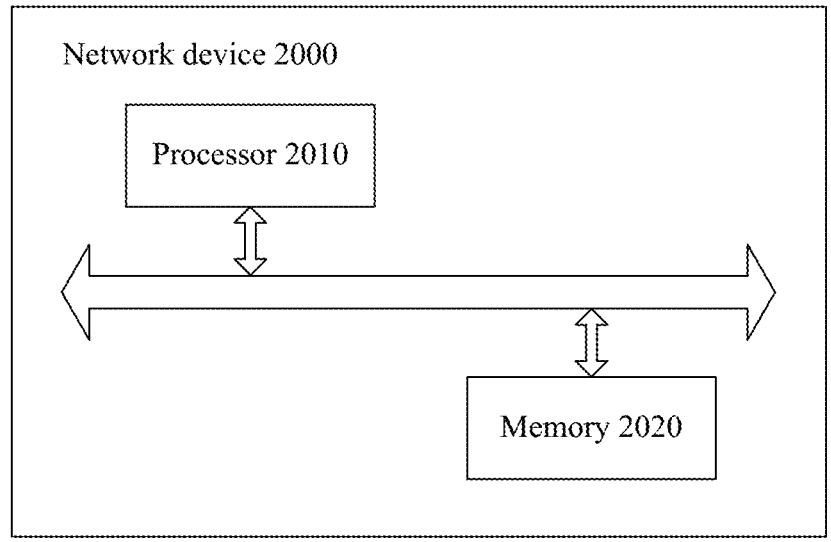
FIG. 8 is a schematic structural diagram of a network device 2000 according to Embodiment 5 of the present disclosure.

According to Embodiment 1 of the present disclosure, Embodiment 5 of the present disclosure provides a network device 2000. As shown in FIG. 8, the detection device 2000 includes a processor 2010 and a memory 2020, and the processor 2010 and the memory 2020 complete mutual communication by using a bus.

The memory 2020 is configured to store a computer operation instruction. The memory 2020 may be a RAM or a ROM. The memory 1020 may be an NVROM.

The processor 2010 is configured to execute the computer operation instruction stored in the memory 2020. The processor 2010 may be a CPU or an ASIC, or may be one or more integrated circuits configured to implement this embodiment of the present disclosure.

The processor 2010 executes the computer operation instruction, so that the network device 2000 performs operations performed by the detected device 120 in the method in Embodiment 1.

According to the network device 2000 provided in Embodiment 5 of the present disclosure, it can be further determined that the path that passes through the VNF or the accelerator and that is in the detected device is not faulty, thereby improving fault detection accuracy.

Figure 9:
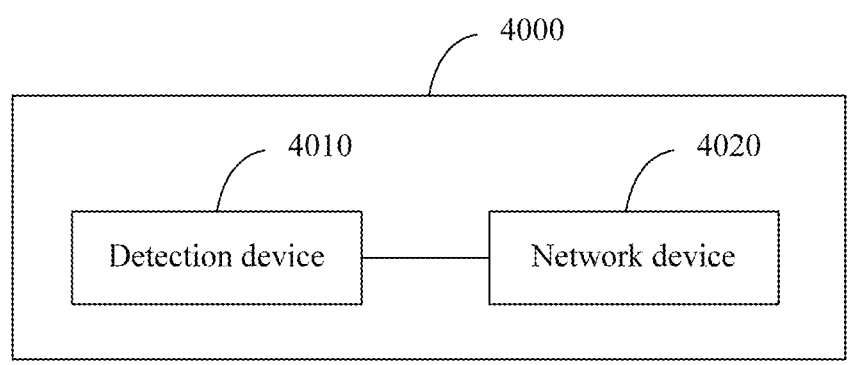
FIG. 9 is a schematic structural diagram of a system 4000 according to Embodiment 6 of the present disclosure.

According to Embodiment 1 of the present disclosure, Embodiment 6 of the present disclosure provides a system 4000 for implementing fault detection. As shown in FIG. 9, the system 4000 includes a detection device 4010 and a network device 4020.

The detection device 4010 may perform operations performed by the detection device 110 in the method in Embodiment 1, and may be the detection device 200 provided in Embodiment 2 or the detection device 1000 provided in Embodiment 4.

The network device 4020 may perform operations performed by the detected device 120 in the method in Embodiment 1, and may be the network device 300 provided in Embodiment 3 or the network device 2000 provided in Embodiment 5.

According to the system 4000 provided in Embodiment 6 of the present disclosure, it can be determined that the path that passes through the VNF or the accelerator and that is in the detected device is not faulty, thereby improving fault detection accuracy.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instruction is loaded and executed on a computer, the procedure or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted from one computer-readable storage medium to another. The computer-readable storage medium may be any usable medium accessible to a computer. The usable medium may be a magnetic medium (for example, a floppy disk, a hard disk, or a magnetic tape), an optical medium (for example, a digital versatile disk (DVD)), a semiconductor medium (for example, a solid state disk (SSD)), or the like.

What is claimed is:

1. A method implemented by a detection device, the method comprising:
    instructing a detected device to configure a detected path and a return path, wherein the detected path is from a first physical port of the detected device to a second physical port of the detected device via a target unit, wherein the return path is from the second physical port to the detection device, and wherein the target unit is a virtualized network function (VNF) of the detected device or an accelerator of the detected device;
    sending a detection packet to the detected device through the first physical port;
    receiving, in response to the sending, the detection packet through the detected path and the return path; and
    determining, based on the receiving, that the detected path is not faulty.

2. The method of claim 1, further comprising further instructing the detected device to add a detection entry into a target forwarding table, wherein the target forwarding table is a forwarding table of the target unit, wherein the detection entry instructs, when receiving a packet matching the detection entry, changing a destination address of the packet to an address of the detection device and sending the packet through the second physical port, wherein the detection packet comprises first information that matches the detection entry, and wherein a destination address of the detection packet corresponds to the first physical port.

3. The method of claim 2, further comprising sending, to the detected device, a control packet comprising a target forwarding table indicator and the detection entry, wherein the target forwarding table indicator indicates that the target forwarding table is of the VNF or the accelerator, and wherein the control packet instructs the detected device to add the detection entry to the target forwarding table.

4. The method of claim 2, further comprising sending, to the detected device, a control packet comprising a target forwarding table indicator and second information for generating the detection entry, wherein the target forwarding table indicator indicates that the target forwarding table is of the VNF or the accelerator, and wherein the control packet instructs the detected device to generate the detection entry based on the second information and to add the detection entry to the target forwarding table.

5. The method of claim 2, wherein the detection packet does not match existing entries in the target forwarding table before the detection entry is added into the target forwarding table.

6. The method of claim 5, further comprising setting a value of a detection match field in the detection entry to enable the detection packet to match the detection entry, but not the existing entries, wherein the detection match field comprises a match field in the target forwarding table.

7. The method of claim 6, wherein the target forwarding table comprises N exact match fields, wherein N≥1, wherein the detection match field comprises a first match field in the N exact match fields, and wherein the method further comprises further setting the value to be different from a value corresponding to first match fields in the existing entries.

8. The method of claim 6, wherein the target forwarding table comprises N exact match fields, wherein N≥1, wherein the detection match field comprises M match fields in the N exact match fields, wherein 1<M≤N and wherein a combination of values that are set and that correspond to the M match fields in the detection entry is different from a combination of values corresponding to the M match fields in the existing entries.

9. The method of claim 6, wherein before instructing the detected device to add the detection entry into the target forwarding table, the method further comprises:
    obtaining a first detection value from the detected device, wherein the first detection value is a value or a combination of values that do not exist in a forwarding table of the VNF and a forwarding table of the accelerator;
    using a match field corresponding to the first detection value as the detection match field; and
    setting the value of the detection match field to the first detection value.

10. The method of claim 6, further comprising further sending the detection packet through a layer-2 network, wherein the detection entry instructs, when receiving the packet matching the detection entry, changing a destination media access control (MAC) address of the packet to a MAC address of the detection device and wherein either the detection match field comprises a source Internet Protocol (IP) address and a value corresponding to the source IP address in the detection entry is an IP address that is of the detection device and that is not used for communicating with another device, or the detection match field comprises a destination IP address and a value corresponding to the destination IP address in the detection entry is an IP address that is of the detection device and that is not used for communicating with another device.

11. The method of claim 5, wherein no values of match fields in the detection entry comprise a wildcard character.

12. The method of claim 2, wherein a priority of the detection entry is higher than a priority of any existing entry that is capable of matching the detection packet, wherein the existing entry is an entry comprised in the forwarding table of the VNF or the forwarding table of the accelerator before the detection entry is configured.

13. The method of claim 2, further comprising:
sequentially performing fault detection on a plurality of detected paths in the detected device, and
instructing, before performing the fault detection on an Xth detected path, the detected device to delete a detection entry from fault detection on an (X−1)th detected path,
wherein X≥2.

14. A method implemented by a detected device, the method comprising:
configuring a detected path and a return path, wherein the detected path is from a first physical port of the detected device to a second physical port of the detected device via a target unit, wherein the return path is from the second physical port to a detection device, and wherein the target unit is a virtualized network function (VNF) of the detected device or an accelerator of the detected device;
receiving a detection packet through the first physical port; and
transmitting, after the receiving, the detection packet through the detected path and the return path.

15. The method of claim 14, further comprising:
adding a detection entry into a target forwarding table of the target unit, wherein the detection entry instructs, when receiving a packet matching the detection entry, changing a destination address of the packet to an address of the detection device and sending the packet through the second physical port;
determining that the detection packet matches the detection entry in the target forwarding table;
changing, in response to the determining, a destination address of the detection packet to the address of the detection device; and
sending, in response to the determining, the detection packet through the second physical port.

16. The method of claim 15, further comprising:
receiving, from the detection device, a control packet comprising a target forwarding table indicator, wherein the target forwarding table indicator indicates that the target forwarding table is of the VNF or the accelerator, and wherein the control packet further comprises the detection entry or information for generating the detection entry; and
adding the detection entry to the target forwarding table based on the control packet, or generating the detection entry based on the information and adding the detection entry into the target forwarding table.

17. A detection device comprising:
a memory comprising instructions; and
a processor coupled to the memory and configured to execute the instructions to:
instruct a detected device to configure a detected path and a return path, wherein the detected path is from a first physical port of the detected device to a second physical port of the detected device via a target unit, wherein the return path is from the second physical port to the detection device, and wherein the target unit is a virtualized network function (VNF) of the detected device or an accelerator of the detected device;
send a detection packet to the detected device through the first physical port;
receive, in response to the sending, the detection packet through the detected path and the return path; and
determine, based on the receiving, that the detected path is not faulty.

18. The detection device of claim 17, wherein the processor is further configured to further instruct the detected device to add a detection entry into a target forwarding table of the target unit, wherein the detection entry instructs, when receiving a packet matching the detection entry, changing a destination address of the packet to an address of the detection device and sending the packet through the second physical port, wherein the detection packet comprises first information that matches the detection entry, and wherein a destination address of the detection packet corresponds to the first physical port.

19. A detected device comprising:
an accelerator; and
a virtualized network function (VNF) configured to:
configure a detected path and a return path, wherein the detected path is from a first physical port of the detected device to a second physical port of the detected device via a target unit, wherein the return path is from the second physical port to the detection device, and wherein the target unit is the VNF or the accelerator;
receive a detection packet through the first physical port when the target unit is the VNF; and
transmit the detection packet through the detected path and the return path when the target unit is the VNF;
wherein the accelerator is configured to:
receive the detection packet through the first physical port when the target unit is the accelerator; and
transmit the detection packet through the detected path and the return path when the target unit is the accelerator.

20. The detected device of claim 19, wherein the VNF is further configured to add a detection entry into a target forwarding table of the target unit, wherein the detection entry instructs, when receiving a packet matching the detection entry, changing a destination address of the packet to an address of the detection device and sending the packet through the second physical port, and wherein when transmitting the detection packet and when determining that the detection packet matches the detection entry, the VNF or the accelerator is further configured to:
change a destination address of the detection packet to the address of the detection device; and
send the detection packet through the second physical port of the detected device.

* * * * *